June 28, 1960 L. G. ZACHOS 2,942,349
LIQUID LEVEL INDICATOR
Filed Dec. 21, 1955
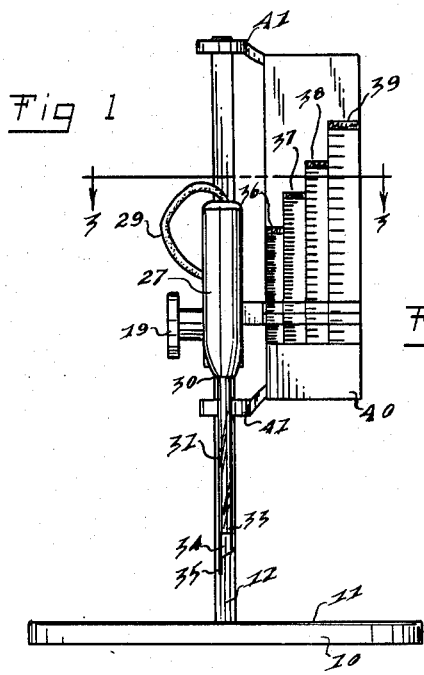
Fig 1
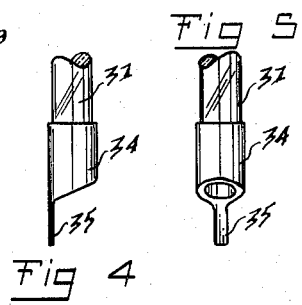
Fig 4
Fig 5
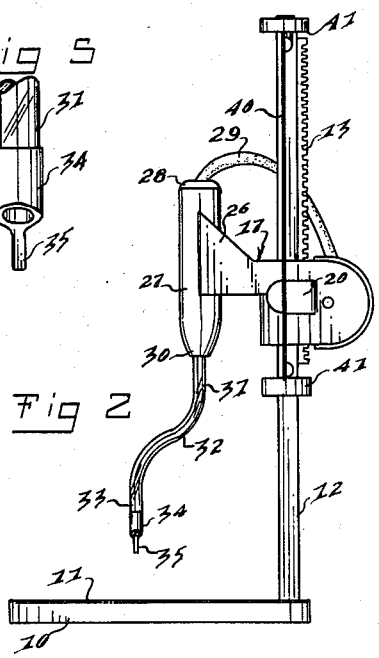
Fig 2
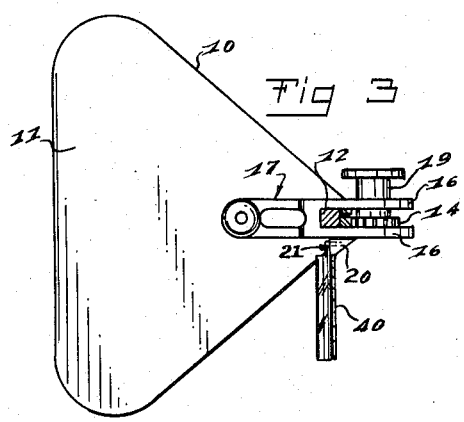
Fig 3
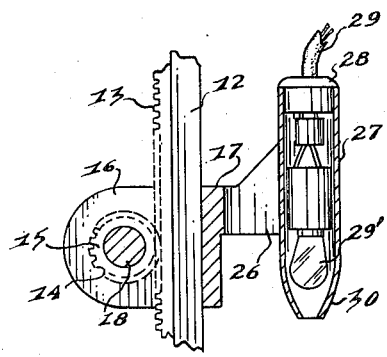
Fig 6
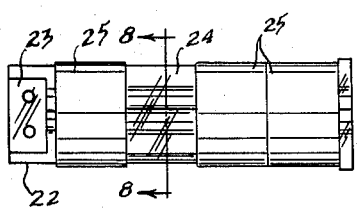
Fig 7
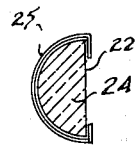
Fig 8
INVENTOR.
LOUIS G. ZACHOS
BY
ATTORNEY

United States Patent Office

2,942,349
Patented June 28, 1960

2,942,349

LIQUID LEVEL INDICATOR

Louis G. Zachos, 350 Simpson St. NW., Atlanta, Ga.

Filed Dec. 21, 1955, Ser. No. 554,578

5 Claims. (Cl. 33—126.7)

This invention relates to a liquid level indicator and is more particularly concerned with devices for successively indicating successive predetermined liquid levels in vessels or containers. While the inventive concept may be variously applied in the determination of liquid levels for a wide variety of purposes, the invention is admirably adapted for use in the mixing of paints, lacquers, enamels, inks and like pigment bearing liquids.

The present invention constitutes an improvement over the devices of my prior patents, No. 2,326,111, issued August 10, 1943, and No. 2,685,743, issued August 10, 1954. In the earlier of these prior patents, I adjusted the height of the light emitting end of a light transmitting rod within a receptacle in accordance with scale markings. As the height of liquid within the receptacle rose to immerse the light emitting end of the rod, emanations were blocked and the operator thus appraised the liquid level by visually noting the termination of such light emission. My second patent provided a similarly adjustable rod having electrically conductive characteristics arranged in circuit with an electrical light source, the arrangement being such that contact of the liquid with the rod would produce visual response of the light source.

While the devices of both of my prior patents have proven effective and efficient and have achieved substantial commercial success, certain improvements have been made which are deemed to materially advance the state of the art as to such devices. In both of my prior devices, the vertically suspended and adjustable rods were straight, thus, their upper support was of necessity considerably removed from the scale in order to accommodate the central location of the rod within a receptacle in which the liquid level was to be determined. Such overhanging or outboard mounting of the straight rod militated against the provision of a compact and rigid assembly and involved complicity and multipilicity of parts increasing production costs and the likelihood of inaccurate responses. Furthermore, the scale indicating arms of my prior devices by which the presetting of the rod height was determined were transparent plastic members bearing central guide lines for registration with the appropriate scale markings. Such arms provided poor visibility therethrough and thus the accurate setting of the rod was difficult. Vertical adjustment of the rod and its mounting as well as the associated indicating arm was by way of manual adjustment along the scale standard after release of a securing thumb nut or set screw. Such adjustment led to difficulties of manipulation and inaccuracies of setting. Furthermore, when the sensing element was light transmitting and level indication depended upon contact with this element to shut off such emission, frequent cleaning of the element was required.

It is therefore among the more general objects of the present invention to provide a novel and improved liquid level indicating means based upon the structure of my previous patents above referred to and so constructed and arranged so as to enhance the efficiency and effectiveness thereof.

It is also an object of the invention to provide in an improved device of the character designed for compactness and rigidity of structure not only insuring faithful operation and longevity of service but also affording economies in manufacture.

Another object of the invention is to provide in a device of the character set forth a novel and improved scale arm whereby the scale is readily visible and whereby the accurate setting of such arm is facilitated.

A further object of the present invention is to provide improved locating means for the rod and scale arm mounting assembly by which a rapid and accurate setting of such means may be easily effected and by which the setting may be maintained without requiring the securement of set screws or thumb screws or the like.

The invention also has as an objective that of providing an improved sensing rod capable of central location within receptacles of widely varying size and for the mounting thereof substantially close to the scale standard.

An objective also obtained by the present invention is the provision of light modifying means operable without contact of the fluid by the light transmitting element and hence free from the necessity of frequent cleaning of such element.

Numerous other objects, features and advantages of the present invention will become apparent from a consideration of the following specification taken in conjunction with the acocmpanying drawings in which:

Fig. 1 is a front elevation of one embodiment of the present invention.

Fig. 2 is a side elevation of the device of Fig. 1.

Fig. 3 is a cross-sectional view taken on line 3—3 of Fig. 1.

Figs. 4 and 5 are front and side views, respectively, showing in detail the liquid contacting terminal of the sensing rod.

Fig. 6 is a detailed vertical sectional view of the rod and scale arm mounting unit and its operating mechanism.

Fig. 7 is a front detail elevation of the scale arm.

Fig. 8 is a sectional view taken along line 8—8 of Fig. 7.

While certain aspects of the present inventive concept may be employed in widely differing structural adaptations, that form of the invention here elected for illustration may be generally characterized as comprising a base including a surface for the reception of a vessel to which different fluids are to be supplied in predetermined quantities, a standard rising from said base, a scale fixedly mounted by said standard and a combined scale arm and sensing unit vertically adjustable on the standard. One of the unique characteristics of the present invention is that the unit above referred to includes, in combination with a light source, a light conducting element such as Lucite formed with an outwardly directed bend so as to dispose the lower sensing end thereof outwardly from the unit and its standard and centrally of the supporting surface without requiring an outward extension of the unit as is required where the light conducting means is straight. Thus the complexities and dangers of an overhanging scale arm and sensing unit are avoided. Another novel feature of the present construction is the provision of a depending liquid engaging finger mounted at the end of the light conducting rod in such manner as to engage the liquid surface as the liquid rises and before it reaches the light emitting end of the rod. By the provision of such finger the liquid surface will be disturbed and agitated by the finger causing light refraction and difraction to indicate to the operator the location of the surface prior to blotting out of the ray emissions by submergence of the rod end. Where observation is dependent upon liquid reaching the rod itself the rod must be removed and cleaned after each level is reached, but in the present case the finger, upon striking the liquid surface, will give warning by shimmer of the reflection and light emission need not be terminated by contact of the liquid with the rod. The present invention also provides rack and pinion means for adjusting the height of the scale arm and sensing unit, thus avoiding the necessity for successive securements of the unit in adjusted positions and facilitating an easy and accurate one-hand setting of the unit. The scale arm of the present structure is of magnifying contour to aid in observation of the scale thereunder and is further provided with slideable hoods adapted to mask those portions of the scale not in use, thus helping the operator to concentrate his attention on the adjustment of the arm with respect to the elected scale markings.

Referring now to the drawings, that form of the invention here presented by way of illustration includes a flat base 10 having a flat upper surface 11 adapted to receive a fluid receiving receptacle (not shown). For convenience, the base 10 is here shown as triangular and while the base may be formed of any desired material, it is understood that it is preferably of such weight as to preclude inadvertent tipping as the scale arm and sensing unit are moved upon their standard. At one apex of the triangular base the vertical standard 12 is secured. While the standard 12 is generally square in cross-section, the rear edge thereof is formed with a rack 13 adapted to be enmeshed by the teeth 14 of an adjusting gear 15 mounted between the furcated ears 16 of the body 17 of the scale arm and sensing unit. The gear 15 is mounted upon and secured to a shaft 18 having bearings through the ears 16, one protruding end thereof having secured thereto an operating knob 19. Obviously, this arrangement is such that as the knob 19 is turned the unit body 17 will be raised or lowered upon the standard 12. This arrangement further provides frictional engagement between gear and rack so as to preclude the necessity for separate securing means for the unit when in its adjusted position. It will also be seen that this construction provides for easy and accurate one-hand adjustment of the unit.

For mounting the outwardly extending scale arm, the side of the body 17 of the unit is formed with lug 20, the front face 21 of which is flat and receives for securement thereto the rear flat face 22 of the scale arm securing projection 23. As more clearly shown in Fig. 8, the scale arm itself comprises a semi-circular transparent body 24 of glass or like transparent material. The rounded side of the body 24 faces forwardly so as to provide a magnifying effect for the scale as viewed through the body. For concentrating the operator's vision on that scale column which is to be used in any particular phase of operation, there is provided on the body 24 a plurality of independently slideable semi-circular hoods 25. The opaque hoods 25 are here shown as three in number and of a collective length equal to three-quarters of the length of the scale arm and of the width of the scale which it subtends. Thus, with a scale as here shown having four vertical sets of markings, the hoods may be arranged to mask the three sets of markings not in use, thus concentrating the operator's vision through the magnifying segment of the scale arm lying directly over the scale markings selected for immediate use.

The body 17 of the unit also carries a forwardly extending bracket arm 26 to which is vertically secured a cylindrical light casing 27, the upper end of which is closed by a cord plug 28 through which extends an energizing electrical cord 29 for a lamp 29' disposed adjacent the lower tapering open end 30 of the casing 27. Mounted within the casing 27 and extending downwardly through the lower open end thereof is the light conducting rod 31 formed of such polarizing material as Lucite and thus acting to transmit light through the rod with a minimum of side light emission. As indicated at 32, the rod 31 is bent outwardly so that its lower terminal end 33 is disposed centrally over the supporting surface 11 without necessitating the outward mounting of the unit body 17 in such extended relation to the standard 12. At the extreme lower end of the rod, there is the circular body 34 from which extends a downwardly directed liquid contact finger 35. As hereinbefore indicated, the finger 35 is designed to contact the rising liquid surface before the liquid level reaches the lower end of the rod. Such contact will disturb the liquid surface whereby the light emanating from the rod will cease to reflect a regular light pattern but the light will shimmer due to the agitation of the otherwise smooth surface of the liquid. Such shimmering caused by the deflection and difraction of light will serve to indicate to the operator that the liquid has reached the height set by the position of the unit and as indicated on the scale. The further supply of that particular liquid may then be terminated before the liquid reaches the end of the rod, and hence the rod may be then adjusted to the next height of liquid desired without requiring removal of the rod and cleaning therefrom of such liquid as may otherwise preclude emission of light from the end of the rod.

The scale markings heretofore referred to are arranged in four vertical columns 36, 37, 38 and 39 upon a scale plate 40 secured as by brackets 41 to the standard 12. The present form of the invention is intended for use as a paint or pigment content determining device and for such purpose the scale is arranged to indicate by each vertical column of markings the desired quantities of selected colors to be mixed for each total quantity of final fluid. In the operation of the device, having selected the total quantity desired and having placed a suitable receptacle upon the surface 11 the hoods 25 are arranged to mask all indicating columns other than that appropriate for the total quantity desired. The elected scale column will thus be displayed through the magnifying scale arm 24. The unit body 17 is then adjusted by rotation of the knob 19 to a height for a particular fluid as indicated by the scale. Such fluid is then introduced into the receptacle while the end 33 of the rod is emitting light upon the fluid surface. When the liquid level reaches the finger 35, which has been adjusted to the height of that liquid required, the surface disturbance caused by the contact of the finger therewith will cause the even reflection of light to be terminated and displaced by a shimmering which the operator will take note of and terminate the further supply of that particular fluid. Thereupon the unit may be raised to the next level desired as for some different fluid and the operation is then repeated until the total mixture is completed.

It will of course be understood that in the practice of the present invention numerous changes and modifications may be resorted to and the full use of equivalents may be employed without departing from the spirit or scope of the invention as set forth in the following claims.

I claim:

1. In combination with a light transmitting rod for illuminating the surface of a rising column of liquid, a circular body fitted upon the lower end of said rod surrounding said end and extending therebelow, a depending finger formed on said body to engage and agitate the liquid surface before such surface reaches the lower end of said rod.

2. In combination with a light transmitting rod for illuminating the surface of a rising column of liquid, an opaque cylindrical body fitted upon the lower end of said rod enclosing said end and extending therebelow, a depending finger formed on said body to engage and agitate the liquid surface before such surface reaches the lower end of said rod.

3. In combination with a light transmitting rod for illuminating the surface of a rising column of liquid, a cylindrical body at the lower end of said rod enclosing said end, a depending tapering finger formed on said body for engaging and agitating the liquid surface before such surface reaches the lower end of said rod.

4. In combination with a light transmitting rod for illuminating the surface of a rising column of liquid, an opaque body at the lower end of said rod including a cylindrical portion enclosing said end and extending therebelow, the lower end of said body being downwardly inclined and said body including a depending side finger to engage and agitate the liquid surface before such surface reaches the lower end of said rod.

5. In a device of the character described, a receptacle supporting surface, a vertical standard mounted thereon, a scale carried by the standard, a semi-circular transparent magnifying scale arm and slidable opaque hoods on said scale arm, a securing unit for said arm adjustably mounted on said standard, rack and gear means for vertically adjusting said unit on said standard, a light transmitting rod carried by said unit, said rod being bent to dispose its lower end away from said standard at approximately the center of said supporting surface, and a cylindrical member on the lower end of said rod extending therebelow, and a finger formed on said cylindrical member for contacting the surface of a liquid to agitate the same and disrupt the reflection of light therefrom.

References Cited in the file of this patent

UNITED STATES PATENTS

| | | |
|---|---|---|
| 2,169,952 | Holmes | Aug. 15, 1939 |
| 2,237,443 | Marienthal | Aug. 8, 1941 |
| 2,399,291 | O'Neill | Apr. 30, 1946 |
| 2,467,615 | Floyd | Apr. 19, 1949 |
| 2,561,525 | McCauley | July 24, 1951 |
| 2,572,531 | Steinkoenig | Oct. 23, 1951 |
| 2,607,122 | Overmeyer et al. | Aug. 19, 1952 |
| 2,675,620 | Whitcomb | Apr. 20, 1954 |
| 2,685,743 | Zachos | Aug. 10, 1954 |

FOREIGN PATENTS

| | | |
|---|---|---|
| 535,838 | Great Britain | Apr. 23, 1941 |